March 13, 1956  J. B. GURY, JR  2,737,763
SHARPENER FOR CLOTH CUTTING MACHINE
Filed April 19, 1954  4 Sheets-Sheet 1

INVENTOR.
JOHN B. GURY, JR.
BY
ATTORNEY

March 13, 1956 J. B. GURY, JR 2,737,763
SHARPENER FOR CLOTH CUTTING MACHINE
Filed April 19, 1954 4 Sheets-Sheet 2
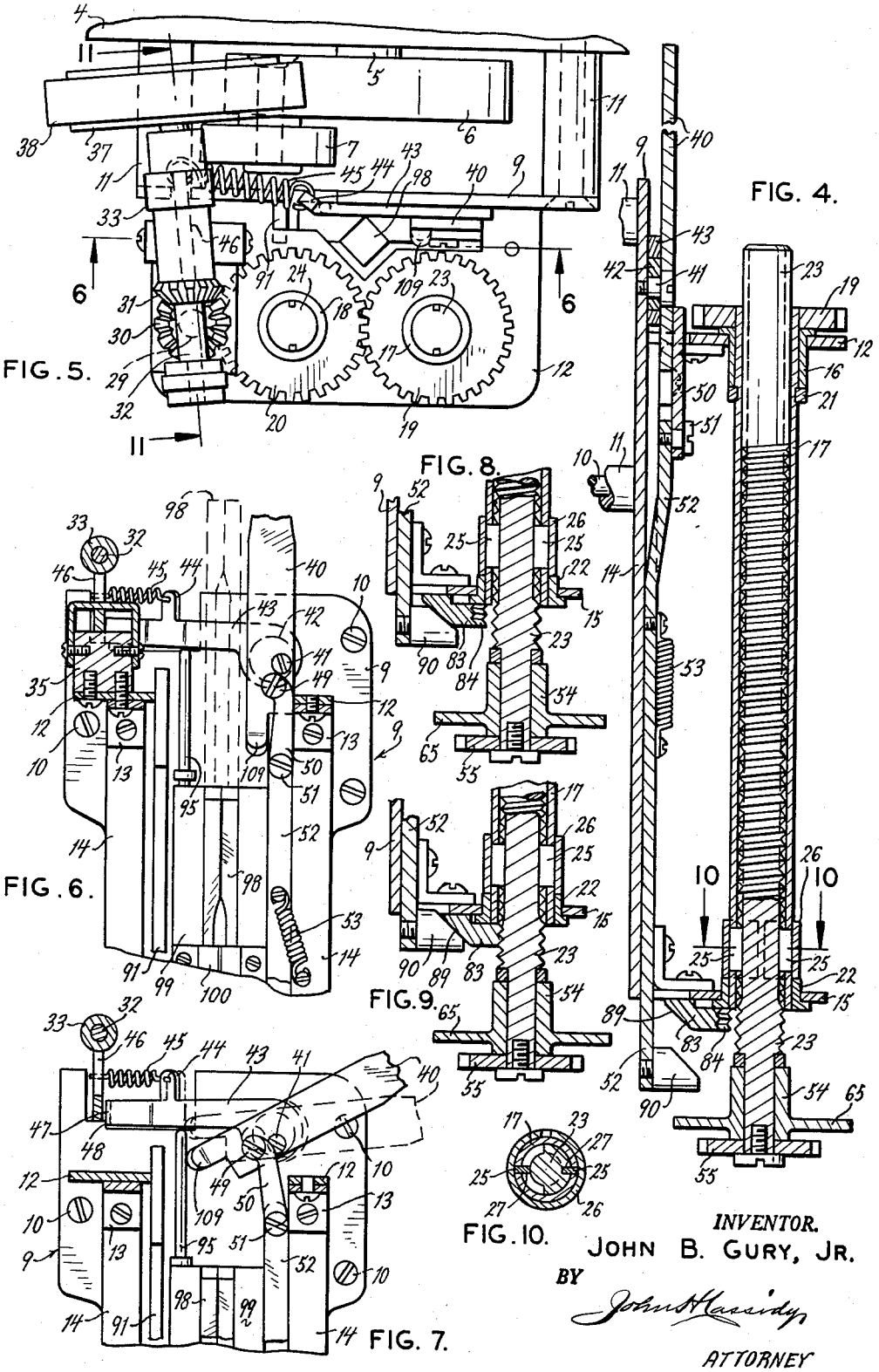
INVENTOR.
JOHN B. GURY, JR.
BY
John H Cassidy
ATTORNEY

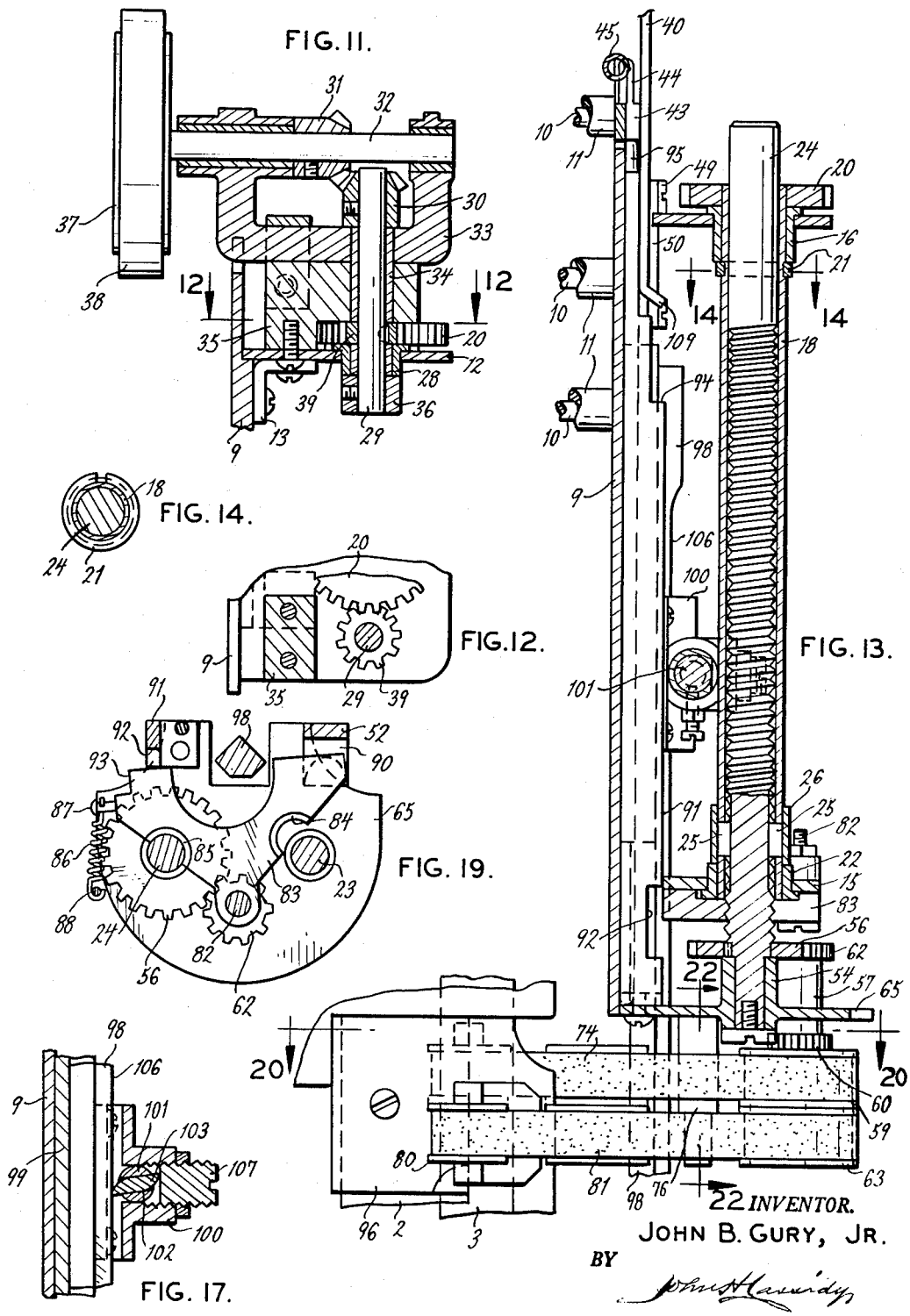

March 13, 1956 J. B. GURY, JR 2,737,763
SHARPENER FOR CLOTH CUTTING MACHINE
Filed April 19, 1954 4 Sheets-Sheet 4

INVENTOR.
JOHN B. GURY, JR.
BY
John H Cassidy
ATTORNEY

United States Patent Office 2,737,763
Patented Mar. 13, 1956

2,737,763

SHARPENER FOR CLOTH CUTTING MACHINE

John B. Gury, Jr., Richmond Heights, Mo.

Application April 19, 1954, Serial No. 424,023

11 Claims. (Cl. 51—246)

This invention pertains to a device for sharpening the blade of a cloth-cutting machine of the type used to cut a number of layers of cloth at one time.

An object of this invention is to provide a sharpening device mounted on the cutting machine, which may be brought into operation quickly and easily at any time.

Generally stated, the device is mounted on a cutting machine of the usual type having a base, a motor mounted on a pedestal above said base, and a reciprocating knife movable vertically and driven by the motor. A frame mounted on the motor to extend vertically has mounted thereon a pair of vertically extending screws guided for up-and-down movement. Driving means which may be connected to be driven by the motor drives the screws in opposite directions. A sharpening device consisting of a pair of abrasive belts arranged to contact the knife is mounted on a carrier on the lower ends of said screws. A control element is arranged to move half-nuts into engagement with one or the other of said screws. Starting means are provided to simultaneously engage the driving means with the motor so as to rotate the screws and to shift said control element to bring into engagement one of said half-nuts with the screw rotating in such a direction that the screw is caused to move downward by the action of the nut. This carries the sharpening belts downward along the edge of the knife. Means are provided operating at the end of the downward movement to shift said control element to bring the other half-nut into engagement with the other screw, whereupon the screws and the sharpening device move upward to return to their initial position. Upon arriving at that position, a tripping device disengages said driving means from the motor and moves said control element to neutral position.

A preferred embodiment of the invention is illustrated in the accompanying drawings, in which—

Fig. 4 is an enlarged section on line 4—4 of Fig. 3;

Fig. 5 is an enlarged top view of the mechanism;

Fig. 6 is a partial section on line 6—6 of Fig. 5 showing the parts in the position which they occupy when the device is not operating;

Fig. 7 is a view similar to Fig. 6 showing the position of these parts during the operation of the sharpener;

Fig. 8 is a detail similar to Fig. 4, showing the initial position of the means for shifting the control element;

Fig. 9 is a similar view showing said parts after said control element has been moved into engagement with the screw;

Fig. 10 is a section on line 10—10 of Fig. 4;

Fig. 11 is a section on line 11—11 of Fig. 5;

Fig. 12 is a fragmentary section on line 12—12 of Fig. 11;

Fig. 13 is an enlarged view taken about on line 13—13 of Fig. 3;

Fig. 14 is a section on line 14—14 of Fig. 13;

Fig. 17 is a section on line 17—17 of Fig. 15;

Fig. 19 is a similar view showing the position of the parts during the return movement;

Figure 2:
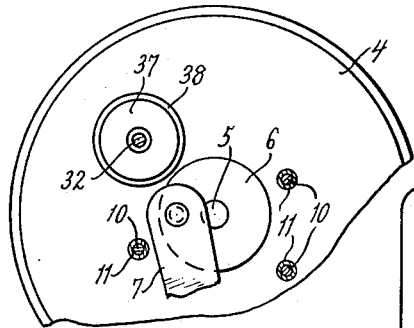
Fig. 2 is a detail taken about on line 2—2 of Fig. 1.

The cutting machine to which this invention applies may be of any suitable type having a base 1 supporting a standard or pedestal 2 in which a knife 3 is mounted to reciprocate vertically. A motor 4 has a shaft 5 having fixed thereto a crank disk 6 operating a pitman 7 connected to the blade 3 to cause the same to move up and down when the disk 6 is rotated by the motor. A handle 8 is usually attached to the standard 2 whereby the machine may be manipulated during the cutting operation.

In accordance with this invention, a frame indicated generally at 9 is attached by screws 10 extending through suitable spacers 11 to the frame of the motor 4. An upper platform 12 is attached to the frame 9 by means of brackets 13 or otherwise. Said frame has side members 14 extending downward and having attached thereto at their lower ends a lower platform 15.

Journaled in bearing sleeves 16 mounted in the platform 12 are two sleeves 17 and 18. These sleeves have fixed thereto at their upper ends driving gears 19 and 20 respectively. As shown in Fig. 5, the gears 19 and 20 mesh with each other so that they and the sleeves attached thereto must rotate in opposite directions. The sleeves 17 and 18 are retained in their bearing sleeves 16 against downward movement by the gears 19 and 20 and against upward movement by split spring collars 21 engaging grooves in said sleeves as shown in Figs. 4 and 13.

The lower ends of the sleeves 17 and 18 are guided in similar bearing sleeves 22 mounted in the lower platform 15.

Mounted for up-and-down movement in the sleeves 17 and 18 are screws 23 and 24, respectively. As shown in Fig. 10, each of the screws 23 and 24 is splined to its sleeve by a pair of keys or splines 25 mounted in short slots in the sleeves 17 and 18 and retained by outer sleeves 26. The keys 25 engage grooves 27 extending along the screws 23 and 24. By this arrangement, the screws may move vertically in their sleeves but are driven in rotation with said sleeves by the keys 25.

Journaled in a sleeve bearing 28 in the upper platform 12 is a vertical spindle 29 having fixed to the top thereof a bevel gear 30 meshing with a similar gear 31 on a horizontal shaft 32 journaled in a bracket 33. The spindle 29 also passes through a sleeve 34 which passes through the bracket 33 to provide a pivot therefor. The sleeve 34 is supported by a bracket 35 secured to the platform 12. The spindle is retained against upward movement by a collar 36 secured thereto. The shaft 32 has fixed to the end thereof a driving wheel 37 which may be provided with a tire 38 of rubber or the like to provide a frictional driving surface. As may be seen from Fig. 5, movement of the bracket 33 on the pivot provided by the sleeve 34 may bring the tire 38 into engagement with the rim of the crank disk 6, so that the wheel 37 may be driven thereby. Driving said wheel, therefore, will drive the shaft 32 and the gear 31, which in turn drives the gear 30 and the spindle 29. Such spindle has keyed thereto a pinion 39 which meshes with the gear 20 to drive the two sleeves 17 and 18.

A manipulating handle 40 is pivoted on the frame 9 by a pin 41. Fixed to the handle to move therewith and also pivoted at 41 is an eccentric 42. This eccentric is arranged to move in a receiving aperture in a link 43 having an upward extension 44 connected by a spring 45 to a web 46 on the bracket 33. When the arm 40 is moved to the right, Fig. 6, the action of the eccentric 42 is to draw the link 43 to the right which acts through the spring 45 to move said bracket and the wheel 37 to the right, Fig. 5, whereby said wheel is brought into contact with the rim of the disk 6. When the handle 40 is moved to a horizontal position, as shown in broken lines in Fig. 7, the end 47 of the link 43 drops behind a shoulder 48 formed on the frame 9 so as to maintain the wheel 37 in engagement with the disk 6 under the tension of the spring 45. The handle 40 also has pivoted thereto at 49 a link 50 pivoted at 51 to a vertical slide 52 which is connected by a spring 53 to one of the side members 14 of the frame. The spring 53 acts through the slide 52 and the link 50 to pull the handle 40 to the inclined position shown in Fig. 7 when released by the hand. This puts said handle in position to be easily returned to its vertical position by the spring 45 when the drive is interrupted by raising the link 43 out of engagement with the shoulder 48.

Figure 23:
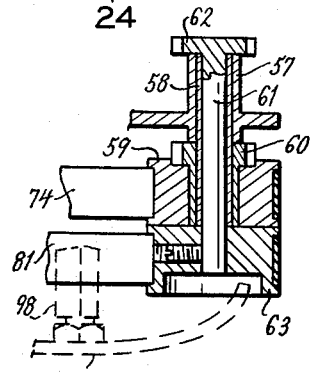
Fig. 23 is a section on line 23—23 of Fig. 21.

The screws 23 and 24 are journaled in upright bosses 54 formed on a carrier 65. The screw 23 has fixed thereto a gear 55 positioned below the carrier 65. The screw 24 has a similar gear 56 secured thereto but located above the carrier 65 and the boss 54. The carrier has formed thereon another boss 57 in which is mounted a sleeve of 58 extending downward from the carrier 65. Mounted to rotate on the sleeve 58 is a drive pulley 59 to which a pinion 60 is secured by a press-fit of the pinion into a depression in the top of the pulley as shown in Fig. 23. Journaled within the sleeve 58 is a vertical spindle 61 having secured to the upper end thereof a pinion 62 similar to the pinion 60 and having secured to the lower end thereof a drive pulley 63 similar to the pulley 59. The boss 57 is so located on the carrier 65 that the pinion 62 meshes with the gear 56 and the pinion 60 with the gear 55. Since the gears 55 and 56 rotate in opposite directions, being driven by the screws 23 and 24 respectively, the gears 60 and 62, and therefore, the pulleys 59 and 63 will be driven in opposite directions of rotation. Since the carrier 65 is supported on the screws 23 and 24, it will move up and down with those screws.

Figure 20:
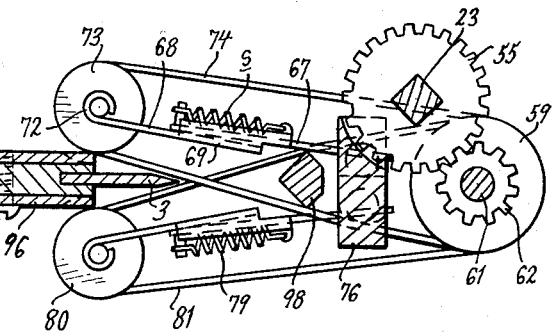
Fig. 20 is a section on line 20—20 of Fig. 13, showing the sharpening belts in disengaged position.
Figure 22:
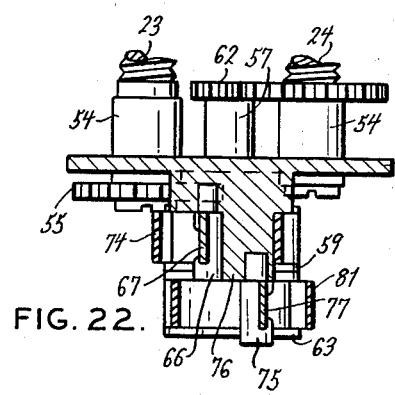
Fig. 22 is a section on line 22—22 of Fig. 13.
Figure 21:
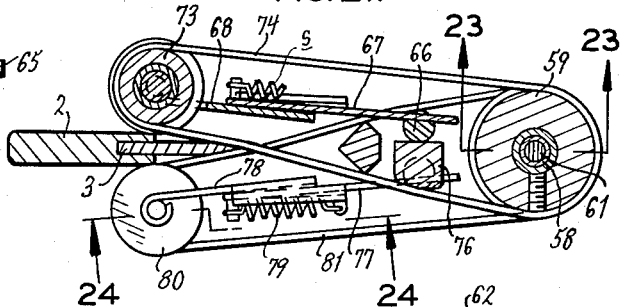
Fig. 21 is a similar view showing the belts in engagement with the knife.
Figure 24:
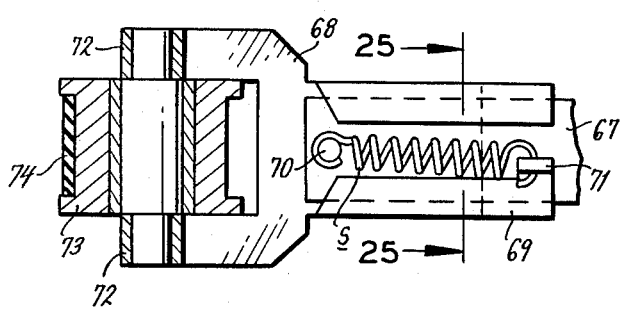
Fig. 24 is a section on line 24—24 of Fig. 21.
Figure 25:
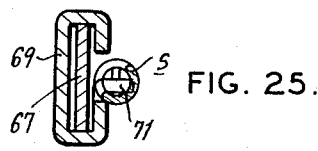
Fig. 25 is a section on line 25—25 of Fig. 24.

Referring now to Figs. 20 to 25, inclusive, fixed in a pin 66 on the carrier 65 is a leaf spring 67. This is mounted on a level with the pulley 59 and extending outward therefrom, as shown in Figs. 20 and 21. Mounted on the leaf spring 67 is a bearing bracket 68 having a shank portion 69 bent into C-form as shown in Fig. 25 and slipped over the leaf spring 67. The bracket is thus movable along the leaf spring 67. A coil spring S is connected to a pin 70 on the leaf spring 67 and to a tab 71 formed on the shank portion 69. The coil spring S, therefore, tends to urge the bearing bracket 68 outward away from the pulley 59. The bracket is formed with a forked end, as shown in Fig. 24, and is equipped with bearings 72 in which an idler pulley 73 is journaled. An abrasive belt 74 is arranged to run on the pair of pulleys 59 and 73.

A similar structure provides for a similar sharpening belt to run on the pulley 63. For this purpose, a pin 75 is mounted in a boss 76 formed on the underside of the carrier 65. Fixed in the pin 75 is a leaf spring 77. A bearing bracket 78, similar in all respects to the bracket 68 is similarly mounted on the leaf spring 77 with a coil spring 79 urging it outward from the pulley 63. The bracket carries an idler pulley 80, and a sharpening belt 81 rides on the two pulleys 63 and 80. As may be seen from Fig. 21, these belts are so located as to pass one on each side of the knife 3 mounted in the standard 2. The leaf springs 67 and 77 urge the belts toward the knife blade and provide the pressure of said belts against the blade while the coil springs S and 79 provide tension in the belts. As this entire sharpening apparatus is carried by the carrier 65, it moves down and up along the blade in response to the movement of the screws 23 and 24.

Figure 18:
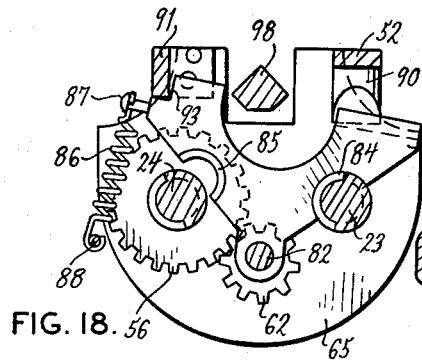
Fig. 18 is an enlarged section on line 18—18 of Fig. 3, showing the parts in position during the downward movement.

Mounted just below the platform 15 and pivoted thereto by a pin 82 is a control element 83 in the form of a triangular plate as shown in Figs. 18 and 19. This element is formed on two of its angular edges with half-nuts 84 and 85 engageable respectively with the screws 23 and 24. By rocking this plate on the pivot 82, its engagement may be shifted from one screw to the other. A tension spring 86 is connected at one end to a pin 87 on the element 83, and at its other end to a pin 88 projecting downward from the platform 15. This spring biases the control element for engagement with the screw 24. As shown in Figs. 4, 8 and 9, the element 83 is formed on its rear edge adjacent the screw 23 with a beveled surface 89. Mounted just below this beveled surface on the lower end of the slide 52 is a cam 90. When the starting lever 40 is moved to the right, Fig. 6, to start the operation of the screws as described above, the slide 52 is drawn upward by the link 50. This brings the cam 90 into engagement with the beveled surface 89 of the element 83 as shown in Fig. 8, which shows the position of these parts with the handle in the full line position of Fig. 7. When the handle is moved to the dotted line position, the cam 90 is raised further and the cam surface 89 acts to move the half-nut 84 into engagement with the screw 23. As already described, this operation of the handle 40 starts the drive of the screws. Accordingly, when the half-nut 84 engages the screw 23, the rotation of said screw causes it to move downward in response to its reaction with said half-nut. The screws 23 and 24 have the same direction of pitch, that is, they are either both right-handed or both left-handed. In the construction illustrated, the rotation of the screws is such that when the control element 83 is thus engaged with the screw 23, said screw is caused to move downward. This movement of the screw carries with it the carrier 65 and, therefore, also the screw 24. At the same time, the sharpening means described in connection with Figs. 20 to 25 is also carried down with the sharpening belts contacting the knife 3 and performing their sharpening operation thereon.

Attached to the carrier 65 and arranged to slide along the frame 9 is a retainer 91 in the form of a metal strip extending upward from the carrier 65 through an opening in the platform 15. This retainer is formed with a notch 92, Fig. 13, which stands opposite the control element 83 when the parts are in their positions of rest, as shown in Fig. 13. This notch permits the element 83 to move on its pivot 82. However, when the sharpening operation is started, the element 83 is moved to the position of Fig. 18 and the screws and the carrier 65 start to move downward. When this downward movement takes place, the portion of the retainer 91 above the notch 92 moves into a notch 93 formed in the element 83, as shown in Fig. 18. This serves to lock the element 83 in the position of Fig. 18 in driving engagement with the screw 23. This action of the retainer continues as the screws move downward and until an upper notch 94, formed in the retainer 91 near its upper end, comes opposite the element 83. This releases said element for movement on its pivot 82 under the action of the spring 86 so as to bring the half-nut 85 into engagement with the screw 24 simultaneously disengaging the half-nut 84 from the screw 23. Since the screw 24 rotates in the opposite direction from the screw 23, this engagement with the element 83 will cause the screw to move upward, thereby carrying the sharpening means upward in a return movement. Upon completion of the return movement, the carrier 65 contacts the lower end of a rod 95 slidably mounted in suitable brackets on the frame 9 and positioned just below the link 43 as shown in Figs. 6 and 7. Upon contact with this rod, the carrier 65 lifts the rod and causes it to engage the lower edge of the link 43 to raise that link to free it from the shoulder 48, whereupon the spring 45 acts, as already described, to move the wheel 37 out of engagement with the disk 6 and to stop the rotation of the screws.

The upper end of the standard 2 has adjustably mounted thereon a spreader 96 positioned to be engaged by the pulleys 73 and 80 when the sharpening device returns to its starting position. This serves to separate the pulleys 73 and 80 sufficiently to clear the belts 74 and 81 from contact with the knife, as shown in Fig. 20. The apparatus remains in this position during the operations of cutting cloth and until another sharpening operation is carried out.

A presser foot 97 is mounted on the lower end of a shank 98 vertically slidable in guides 99 on the frame 9. Also mounted on the frame 9 near its middle point is a bracket 100 in which is journaled a shaft 101. Said shaft has a transverse slot 102 in which is mounted a dog 103 having oppositely directed sharpened edges, as shown in Fig. 17. A torsion spring 104 is connected to a collar 105 fixed to the shaft 101, and at its other end to the bracket 100. This spring is tensioned to tend to rotate the shaft 101 in a clockwise direction, as seen in Fig. 17. This tendency to rotate moves the dog 103 to "in" position for wedging it between a flat surface 106 on the shank 98 of the presser foot and the flat end of a screw 107 threaded into the bracket 100 opposite the dog 103. A handle 108 is connected to the shaft 101 so that the same may be rotated to turn the dog 103 counterclockwise, as seen in Fig. 17, so as to free the shank of the presser foot. This dog serves to hold the presser foot down in whatever position it may be. As the presser foot must be lowered clear down to the base 1 during a sharpening operation, this device serves to insure against the presser foot being lifted from that position during the sharpening operation.

As shown in Figs. 6 and 7, the lower end of the handle 40 is provided with an extension having an out-turned tip 109. The shank 98 of the presser foot is long enough to extend up alongside of the arm 40 as shown in dotted lines in Fig. 6 when the presser foot is raised. With the presser foot in this position, said tip 109 will contact the edge of the shank 98 to prevent movement of the arm 40 for starting the sharpening operation until the presser foot is lowered.

Figure 1:
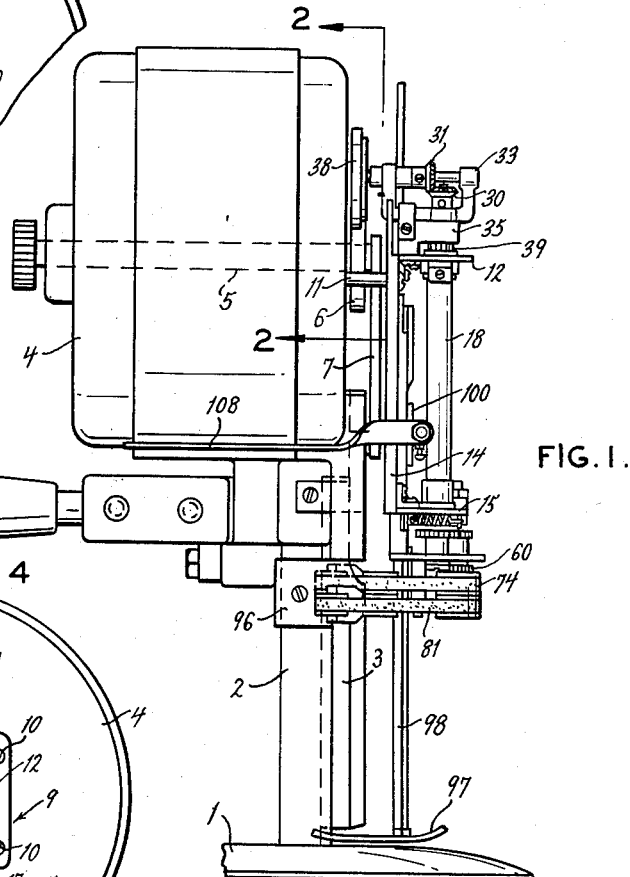
Fig. 1 is a side view of a cutting machine equipped with a sharpening device in accordance with this invention.
Figure 3:
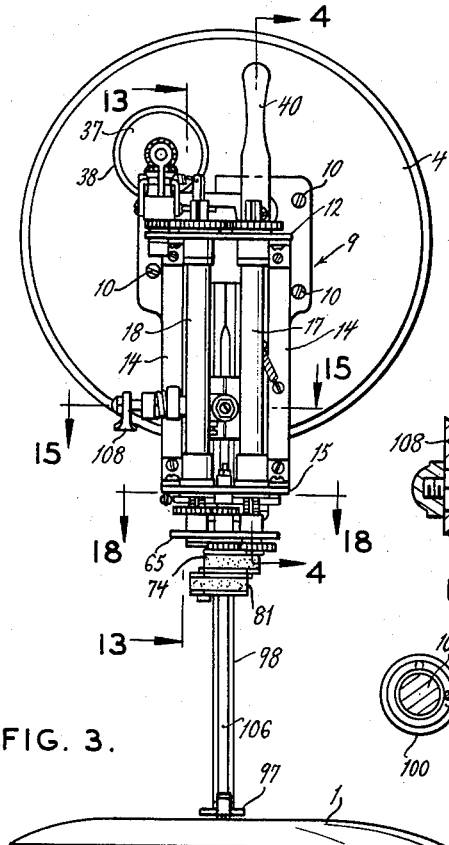
Fig. 3 is a front view of the machine as seen from the right of Fig. 1.
Figures 15, 16:
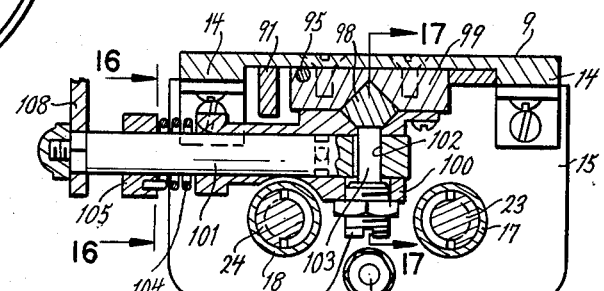
Fig. 15 is an enlarged section on line 15—15 of Fig. 3.
Fig. 16 is a section on line 16—16 of Fig. 15.

In the operation of this device, the presser foot is first lowered to its extreme position as shown in Fig. 1. The handle 40 is then rotated to the right, Figs. 6 and 7, to the dotted line position of Fig. 7. This raises the slide 52 and causes the cam 90 to engage the cam surface 89 and move the control element 83 into engagement with the screw 23. The handle 40 is held in this position until the screws start to move downward so that the retainer 91 is moved down into interlocking position with the notch 93 of the control element, as shown in Fig. 18. The handle 40 is then released and takes the solid line position of Fig. 7. The interaction of the screw 23 with the half-nut 84 moves the screws and the carrier 65 downward. The sharpening device moves downward, the pulleys 73 and 80 moving off of the spreader 96, thereby permitting the springs 67 and 77 to move the sharpening belts into engagement with the knife 3. The belts are then moved down along the knife, performing their sharpening operation. Upon reaching the lower limit of the travel of the screws, the element 83 comes opposite the notch 94 in the retainer, whereupon the spring 86 shifts said element into engagement with the screw 24. This causes the carrier 65 and its assembled parts to move upward in its return stroke. The sharpening belts continue in engagement with the knife during the upward movement and until the idler pulleys engage the spreader 96. Shortly thereafter, the carrier 65 engages the lower end of the rod 95 which is thereby moved upward to disengage the link 43 and stop the operation.

It will be seen that this invention provides a device simple to operate and which is always ready for a sharpening operation. This a great convenience where the goods being cut has a tendency to dull the blade. The sharpening operation is entirely automatic and requires of the operator only the manipulation of the starting handle.

Safety features are provided by the arrangements whereby the handle 40 is prevented from starting the operation until the presser-foot is down, and thereafter the presser-foot is held down by the dog 103. It will be noted that the degree of freedom of said dog is adjustable by means of the screw 107 so that it will always hold securely and any wear can be taken up.

Various changes may be made in the details of construction, within the scope of the appended claims, without departing from the spirit of this invention. Parts of the invention may be used without the whole and improvements may be added while retaining some or all of the advantages of the invention.

I claim:

1. In a cloth cutting machine having a base, a motor supported above the base, and a vertical reciprocating knife supported below and driven by the motor, the improvement comprising, a pair of screws supported on said motor for axial movement vertically along the knife, driving means connected to said motor to drive said screws in rotation in opposite directions, sharpening means supported on said screws for engagement with said knife and for movement therealong, and a control element having half-nuts engageable separately one with each of said screws supported and operating so that engagement with a rotating screw will cause the screws to travel vertically to move said sharpening means along the knife.

2. In a cloth cutting machine having a base, a motor supported above the base, and a vertical reciprocating knife supported below and driven by the motor, the improvement comprising, a pair of screws supported on said motor for axial movement vertically along the knife, driving means connected to said motor to drive said screws in rotation in opposite directions, sharpening means supported on said screws for engagement with said knife and for movement therealong, a control element having half-nuts engageable separately one with each of said screws supported and operating so that engagement with a rotating screw will cause the screws to travel vertically to move said sharpening means along the knife, and shifting means operating automatically at the end of the downward movement of said sharpening means to disengage said control element from the one screw and engage it with the other to cause return movement of said screws and said sharpening means.

3. In a cloth cutting machine having a base, a motor supported above the base, and a vertical reciprocating knife supported below and driven by the motor, the improvement comprising, a pair of screws supported on said motor for axial movement vertically along the knife, driving means connected to said motor to drive said screws in rotation in opposite directions, sharpening means supported on said screws for engagement with said knife and for movement therealong, a control element having half-nuts engageable separately one with each of said screws supported and operating so that engagement with a rotating screw will cause the screws to travel vertically to move said sharpening means along the knife, shifting means operating automatically at the end of the downward movement of said sharpening means to disengage said control element from the one screw and engage it with the other to cause return movement of said screws and said sharpening means, manipulating means connected to simultaneously start said driving means and shift said control element into engagement with the screw for downward movement of said sharpening means, and means operating upon completion of the return movement to stop said driving means.

4. In a cloth cutting machine having a base, a motor supported above the base, and a vertical reciprocating knife supported below and driven by the motor, the improvement comprising, a pair of screws supported on said motor for axial movement vertically along the knife, driving means connected to said motor to drive said screws in rotation in opposite directions, means for controlling movement of said screws, a carrier supported on the lower ends of said screws and in which said screws are journaled, a pair of driving pulleys mounted on said carrier for rotation on a common vertical axis, a pinion fixed to each of said pulleys, a gear on each of said screws meshing with one of said pinions to drive the pulley connected thereto, and sharpening belts on said pulleys.

5. In a cloth cutting machine having a base, a motor supported above the base, and a vertical reciprocating knife supported below and driven by the motor, the improvement comprising, a frame supported on said motor, a pair of vertical sleeves mounted on said frame for rotation on their vertical axes, a screw splined in each of said sleeves for movement therealong while rotating therewith, driving means connected with said motor for rotating said sleeves in opposite directions, sharpening means mounted on said screws, and control means selectively engageable with said screws to move said sharpening means in downward and return movements along said knife.

6. In a cloth cutting machine having a base, a motor supported above the base, and a vertical reciprocating knife supported below and driven by the motor, the improvement comprising, a frame supported on said motor, a pair of vertical sleeves mounted on said frame for rotation on their vertical axes, a screw splined in each of said sleeves for movement therealong while rotating therewith, driving means connected with said motor for rotating said sleeves in opposite directions, sharpening means mounted on said screws, a control element on said frame having half-nuts engageable separately one with each of said screws to cause the screws to travel vertically, and a retainer engaging said element upon the start of downward travel of the screws to maintain its engagement with the screw continuously until the end of such downward travel and thereupon releasing said element.

7. In a cloth cutting machine having a base, a motor supported above the base, and a vertical reciprocating knife supported below and driven by the motor, the improvement comprising, a frame supported on said motor, a pair of vertical sleeves mounted on said frame for rotation on their vertical axes, a screw splined in each of said sleeves for movement therealong while rotating therewith, driving means connected with said motor for rotating said sleeves in opposite directions, sharpening means mounted on said screws, a control element on said frame having half-nuts engageable separately one with each of said screws to cause the screws to travel vertically, a retainer engaging said element upon the start of downward travel of the screws to maintain its engagement with the screw continuously until the end of such downward travel and thereupon releasing said element, and means operating upon such release to shift the engagement of said control element to the other screw thereby starting the return movement of said screws.

8. In a cloth cutting machine having a base, a motor supported above the base, and a vertical reciprocating knife supported below and driven by the motor, the improvement comprising, a pair of screws supported on said motor for axial movement vertically along the knife, driving means connected to said motor to drive said screws in rotation in opposite directions, a carrier supported on the lower ends of said screws and in which said screws are journaled, a pair of driving pulleys mounted on said carrier for rotation on a common vertical axis, a leaf spring supported on said carrier opposite each of said pulleys to extend outward therefrom, a bearing bracket slidably mounted on said spring, yielding means connected to urge said bracket outward from the pulley, an idler pulley journaled in said bearing bracket, and a sharpening belt on each pair of said driving and idler pulleys, said leaf springs being set to bias said belts for pressure against the knife.

9. In a cloth cutting machine having a base, a motor supported above the base, and a vertical reciprocating knife supported below and driven by the motor, the improvement comprising, a pair of screws supported on said motor for axial movement vertically along the knife, driving means connected to said motor to drive said screws in rotation in opposite directions, a carrier supported on the lower ends of said screws and in which said screws are journaled, a pair of driving pulleys mounted on said carrier for rotation on a common vertical axis, a leaf spring supported in said carrier opposite each of said pulleys to extend outward therefrom, a bearing bracket slidably mounted on said spring, an idler pulley journaled in said bearing bracket, a sharpening belt on each pair of said driving and idler pulleys, said leaf springs being set to bias said belts for pressure against the knife, and yielding means connected to urge each of said idler pulleys away from its driving pulley to tension the belt thereon, said belts being unsupported between their pulleys so as to engage the knife under pressure derived from the belt tension only.

10. In a cloth cutting machine having a base, a motor supported above the base, and a vertical reciprocating knife supported below and driven by the motor, the improvement comprising, a pair of screws supported on said motor for axial movement vertically along the knife, driving means connected to said motor to drive said screws in rotation in opposite directions, sharpening means supported on said screws for engagement with said knife and for movement therealong, a control element having half-nuts engageable separately one with each of said screws supported and operating so that engagement with a rotating screw will cause the screws to travel vertically to move said sharpening means along the knife, a presser-foot having a shank movable vertically adjacent said screws, a manipulating handle operable to start the operation of said screws, and an element on said handle formed and positioned to engage said shank to prevent movement of said handle until the presser-foot is moved down.

11. In a cloth cutting machine having a base, a motor supported above the base, and a vertical reciprocating knife supported below and driven by the motor, the improvement comprising, a pair of screws supported on said motor vertically along the knife, driving means connected to said motor to drive said screws in rotation in opposite directions, sharpening means supported on said screws for engagement with said knife and for movement therealong, a control element having half-nuts engageable separately one with each of said screws supported and operating so that engagement with a rotating screw will cause the screws to travel vertically to move said sharpening means along the knife, a presser-foot having a shank movable vertically adjacent said screws, a dog engaging said shank and positioned to permit downward movement thereof but prevent upward movement, means for adjusting the degree of freedom of said dog, and means for releasing said dog to permit raising the presser-foot.

References Cited in the file of this patent

UNITED STATES PATENTS

| | | |
|---|---|---|
| 2,149,731 | Greenbaum | Mar. 7, 1939 |
| 2,183,787 | Clark | Dec. 19, 1939 |
| 2,183,788 | Clark et al. | Dec. 19, 1939 |
| 2,423,570 | Steiner | July 8, 1947 |
| 2,450,473 | Goldie | Oct. 5, 1948 |
| 2,529,441 | Zawistowski | Nov. 7, 1950 |
| 2,537,208 | Clark | Jan. 9, 1951 |
| 2,563,921 | Clark | Aug. 14, 1951 |